(12) United States Patent
Kimura

(10) Patent No.: US 7,039,257 B2
(45) Date of Patent: May 2, 2006

(54) SCANNING OPTICAL APPARATUS AND IMAGE FORMING APPARATUS USING THE SAME

(75) Inventor: Kazumi Kimura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 756 days.

(21) Appl. No.: 10/073,108

(22) Filed: Feb. 12, 2002

(65) Prior Publication Data

US 2002/0114538 A1 Aug. 22, 2002

(30) Foreign Application Priority Data

Feb. 19, 2001 (JP) .................................... 2001-041907

(51) Int. Cl.
*G06K 7/10* (2006.01)

(52) U.S. Cl. .................. 382/321; 382/312; 382/318; 382/322

(58) Field of Classification Search ................ 382/312, 382/318, 321, 322; 250/206.1, 225; 359/204, 359/196, 207, 205, 289; 347/244, 259, 256, 347/243

See application file for complete search history.

(56) References Cited

U.S. PATENT DOCUMENTS

| | | | |
|---|---|---|---|
| 4,731,623 A | 3/1988 | Oda et al. ................ 347/137 |
| 4,848,879 A * | 7/1989 | Nishimura et al. ........ 359/289 |
| 5,043,566 A * | 8/1991 | Andoh et al. ............. 250/206.1 |
| 5,161,047 A | 11/1992 | Tomita et al. ............ 359/216 |
| 5,448,403 A | 9/1995 | Harris ..................... 359/562 |
| 5,510,826 A * | 4/1996 | Koide ..................... 347/256 |
| 5,646,767 A | 7/1997 | Iima et al. ............... 359/206 |
| 6,094,286 A | 7/2000 | Kato ....................... 395/206 |
| 6,215,574 B1 * | 4/2001 | Toyoda .................... 359/207 |
| 6,295,163 B1 | 9/2001 | Kato ....................... 359/575 |
| 6,384,949 B1 * | 5/2002 | Suzuki .................... 359/196 |
| 6,469,818 B1 * | 10/2002 | Kato ....................... 359/204 |
| 6,624,943 B1 | 9/2003 | Nakai et al. .............. 359/569 |
| 6,633,423 B1 * | 10/2003 | Ishibe .................... 359/205 |

FOREIGN PATENT DOCUMENTS

| | | |
|---|---|---|
| JP | 51-120737 | 10/1976 |
| JP | 62-182709 | 8/1987 |
| JP | 63-273823 | 11/1988 |
| JP | 4-212119 | 8/1992 |
| JP | 6-230309 | 8/1994 |
| JP | 7-287180 | 10/1995 |
| JP | 10-68903 | 3/1998 |
| JP | 10-325934 | 12/1998 |
| JP | 11-84118 | 3/1999 |
| JP | 11-271655 | 10/1999 |
| JP | 11-307443 | 11/1999 |
| JP | 11-337853 | 12/1999 |
| JP | 2000-2847 | 1/2000 |

OTHER PUBLICATIONS

Zhou et al., "A Method for Optical Readout Using Phase Jump", IEEE International Conference on Advanced Intelligent Mechatronics, 9–1999, pps. 950–955.*

* cited by examiner

*Primary Examiner*—Anh Hong Do
(74) *Attorney, Agent, or Firm*—Fitzpatrick, Cella, Harper & Scinto

(57) ABSTRACT

At least one beam emitted from a light source is deflected by a deflector, and the beam deflected by the deflector is imaged on a surface to be scanned by imaging optical system having a diffracting surface on at least one surface thereof. Of diffracted lights diffracted by the diffracting surface when the surface to be scanned is scanned by the beam, relative to diffracted light of an order used to form a spot on the surface to be scanned, the expanse of the stray light of one of unnecessary diffracted lights of the other orders undergoing surface-reflection by a refracting surface of the imaging optical system upon incidence on the surface to be scanned is designed to be wider in the sub-scanning direction than in the main scanning direction.

13 Claims, 9 Drawing Sheets

SCANNING OPTICAL APPARATUS AND IMAGE FORMING APPARATUS USING THE SAME

BACKGROUND OF THE INVENTION

1. Field of the Invention

This invention relates to a scanning optical apparatus and an image forming apparatus using the same, and particularly is suitable for an apparatus such as a laser beam printer or a digital copier having the electrophotographic process which is designed such that at least one beam light-modulated and emitted from light source means is reflected and deflected (deflected and scanned) by deflecting means comprising a rotary polygon mirror or the like, whereafter a surface to be scanned is optically scanned through imaging means having at least one diffracting surface to thereby record image information.

2. Related Background Art

In a scanning optical apparatus in a laser beam printer (LBP) or the like, a beam light-modulated in conformity with an image signal and emitted is periodically deflected by a light deflector comprising, for example, a rotary polygon mirror, and is converged into a spot shape on the surface of a photosensitive recording medium (photosensitive drum) by imaging means having an fθ characteristic and that surface is optically scanned to thereby effect image recording.

Further, various scanning optical apparatuses having a diffracting surface on a portion of imaging means (scanning optical means) are proposed, for example, in Japanese Patent Application Laid-Open No. 10-68903, etc. In Japanese Patent Application Laid-Open No. 10-68903, an optical element having a refracting portion (refracting surface) and a diffracting portion (diffracting surface) is used as the imaging means, and the power of the refracting portion and the diffracting portion is set so as to satisfy a desired condition, whereby a magnification change and focus change in the main scanning direction resulting a fluctuation in the temperature of the scanning optical apparatus may be corrected by a change in the power of the refracting portion and diffracting portion of the imaging means and a fluctuation in the wavelength of a semiconductor laser which is light source means. Thereby, even when the temperature fluctuates, it becomes possible to obtain a highly definite image.

The diffracting surface of the optical element having the refracting surface and the diffracting surface on the imaging means is usually formed into such a grating shape that as diffracted light of an order used (diffracted light used), diffracted light of the first order is of maximum intensity. Of diffracted lights diffracted by the diffracting surface at this time, unnecessary (high-order) diffracted lights of the other orders are slight in quantity relative to diffracted light of an order used to form a spot on a surfaced to be scanned. However, in a scanning optical apparatus wherein the angle of incidence onto the diffracting surface is changed by image height, the unnecessary diffracted lights are increased or decreased by the image height. Also in actual manufacture, a manufacturing error occurs to an ideal diffraction grating shape and therefore the unnecessary diffracted light may sometimes be increased.

When such increased unnecessary diffracted lights are incident on the surface to be scanned, they will become flare as stray light and will become a factor which will adversely affect the quality of image.

Further, the imaging means (scanning lens system) of the scanning optical apparatus including such a diffraction optical element is generally produced as a plastic lens and suffers from many problems technically and in cost and is therefore in a tendency to omit an anti-reflection coat provided on the refracting surface. This leads to the problem that unnecessary reflected and diffracted light created by the diffracting surface is reflected by the refracting surface of a plastic lens in which the anti-reflection coat is omitted and is incident on the surface to be scanned and becomes ghost as the stray light of the unnecessary diffracted light.

This state will hereinafter be described with reference to FIGS. 8 and 9 of the accompanying drawings.

FIG. 8 is a cross-sectional view of the essential portions of a conventional scanning optical apparatus in the main scanning direction (a main scanning cross-sectional view).

In FIG. 8, a divergent beam emitted from light source means 91 is made into a substantially parallel beam by a collimator lens 92, and this beam is limited by a stop 93 and enters a cylindrical lens 94 having predetermined refractive power only in the sub-scanning direction. In the main scanning cross section, the substantially parallel beam having entered the cylindrical lens 94 emerges therefrom in its intact state. Also, in the sub-scanning cross section, the beam converges and is imaged as a substantially linear image on the deflecting surface (reflecting surface) 95a of a light deflector 95 comprising a polygon mirror.

The beam 15 (15P, 15U, 15L) reflected and deflected by the light deflector enters imaging means (a scanning lens system) 85 comprising a refracting optical element 81 and a diffracting optical element 82. In FIG. 8, the plastic toric lens 81 and the long diffracting optical element 82 are disposed in succession from the light deflector 95 side. The long diffracting optical element 82 is made of plastic manufactured by injection molding. Both of these optical elements have different power in the main scanning direction and the sub-scanning direction, and cause the beam from the light deflector 95 to be imaged on a surface 96 to be scanned and also correct the inclination of the deflecting surface (mirror surface) of the light deflector 95. The beam having emerged from the imaging means 85 is imaged on the surface 96 to be scanned, and optically scans on the surface 96 to be scanned in the direction of arrow B (the main scanning direction) by the light deflector 95 being rotated in the direction of arrow A to thereby effect the recording of image information.

In FIG. 8, the long diffracting optical element 82 has its incidence surface 83 comprised of a refracting surface and its emergence surface 84 comprised of a diffracting surface (diffraction grating surface). Most of the beam 15 (15P, 15U, 15L) reflected and diffracted by the light deflector 95 is imaged as diffracted light used (usually diffracted light of+first order) on the surface 96 to be scanned and forms a beam spot (not shown).

However, part of the beam 15 (15P, 15U, 15L) reflected and deflected by the light deflector 95 becomes unnecessary diffracted lights of high orders. Attention is paid to reflected diffracted light of the sixth order (reflected sixth-order diffracted light) diffracted by the diffracting surface 84.

In FIG. 8, reference character 16 (16P, 16U, 16L) designates a beam (stray light of unnecessary diffracted light) of the reflected sixth-order diffracted light which is surface-reflected by the refracting surface 83 and further traveling toward the surface 96 to be scanned as diffracted light used (usually diffracted light of the+first order) by the diffracting surface 84. In FIG. 8, it will be seen that such reflected sixth-order diffracted light, although not imaged, is incident on the surface 96 to be scanned as the stray light of the unnecessary diffracted light.

How the stray light of this reflected sixth-order diffracted light scans on the surface to be scanned will now be described with reference to FIG. 9. In FIG. 9, the axis of abscissas represents the image height at which an original beam spot arrives at the surface 96 to be scanned, and the axis of ordinates represents the position in which the stray light of the then reflected sixth-order diffracted light arrives at the surface 96 to be scanned. According to this, it will be seen that as the original beam spot scans on the surface 96 to be scanned, the stray light of the reflected sixth-order diffracted light also scans on the surface 96 to be scanned correspondingly thereto, but the scanning speed falls at image heights of about ±80 mm. Thus, more stray light gathers at the image heights of about ±80 mm, and the deterioration of the quality of image becomes remarkable.

Stray light such as flare or ghost makes an image on the surface to be scanned unclear, and for example, in a laser beam printer (LBP), this leads to the problem that print becomes unclear. Further, in recent years, in order to express images having a halftone, the sensitivity of a photosensitive drum has been in a tendency toward improvement, and the deterioration of the quality of image by the stray light has become unnegligible.

SUMMARY OF THE INVENTION

The present invention has as its object to provide a scanning optical apparatus which can make the image state of the stray light of unnecessary diffracted light created by a diffracting surface into a fuzzy state on a surface to be scanned to thereby prevent the deterioration of an image caused by the stray light of the unnecessary diffracted light and obtain a clear and sharp-cut image, and an image forming apparatus using the same.

In one aspect of the invention, there is provided a scanning optical apparatus in which at least one beam emitted from light source means is deflected by deflecting means, the beam deflected by said deflecting means is caused to be imaged on a surface to be scanned by imaging means having a diffracting surface on at least one surface thereof to be scanned on said surface to be scanned, wherein of diffracted lights diffracted by said diffracting surface, relative to the diffracted light of an order used to form a spot on said surface to be scanned, the expanse of the stray light of one of unnecessary diffracted lights of the other orders undergoing surface-reflection by a refracting surface of said imaging means upon incidence on said surface to be scanned is designed to be wider in the sub-scanning direction than in the main scanning direction.

In further aspect of the foregoing scanning optical apparatus, the stray light of said unnecessary diffracted light is once condensed between said diffracting surface and said surface to be scanned in the sub-scanning cross section.

In further aspect of the foregoing scanning optical apparatus, said imaging means is provided with a diffracting optical element having the refracting surface on the incidence surface thereof and having the diffracting surface on the exit surface thereof, and the power of said refracting surface in the sub-scanning direction is positive.

In further aspect of the foregoing scanning optical apparatus, the stray light of said unnecessary diffracted light is limited by a member disposed in the optical path between said diffracting surface and said surface to be scanned.

In further aspect of the foregoing scanning optical apparatus, the expanse of the stray light of said unnecessary diffracted light satisfies the condition that $$\Phi s/\Phi m > Lo/Lm,$$

(where $\Phi s$: the expanse of the stray light of the unnecessary diffracted light on the surface to be scanned in the sub-scanning direction;

$\Phi m$: the expanse of the stray light of the unnecessary diffracted light on the surface to be scanned in the main scanning direction;

Lm: the scanning width of the stray light of the unnecessary diffracted light;

Lo: the effecting scanning width.)

In further aspect of the foregoing scanning optical apparatus, when said order used is defined as n and said other orders are defined as m, the condition that $$4 \leq m/n \leq 7$$

is satisfied.

In further aspect of the foregoing scanning optical apparatus, the diffracted light of said order used is a transmitted diffracted light of the first order, and said unnecessary diffracted light is a reflected diffracted light of the sixth order.

In another aspect of the invention, an image forming apparatus comprises the foregoing scanning optical apparatus, a photosensitive member disposed on said surface to be scanned, a developing device for developing an electrostatic latent image formed on said photosensitive member by a beam scanned by said scanning optical apparatus as a toner image, a transferring device for transferring the developed toner image to a transferring material, and a fixing device for fixing the transferred toner image on the transferring material.

In still another aspect of the invention, an image forming apparatus comprises the foregoing scanning optical apparatus, and a printer controller for converting code data inputted thereto from an external device into an image signal and inputting it to said scanning optical apparatus.

DESCRIPTION OF THE PREFERRED EMBODIMENTS

<Embodiment 1>

Figure 1:
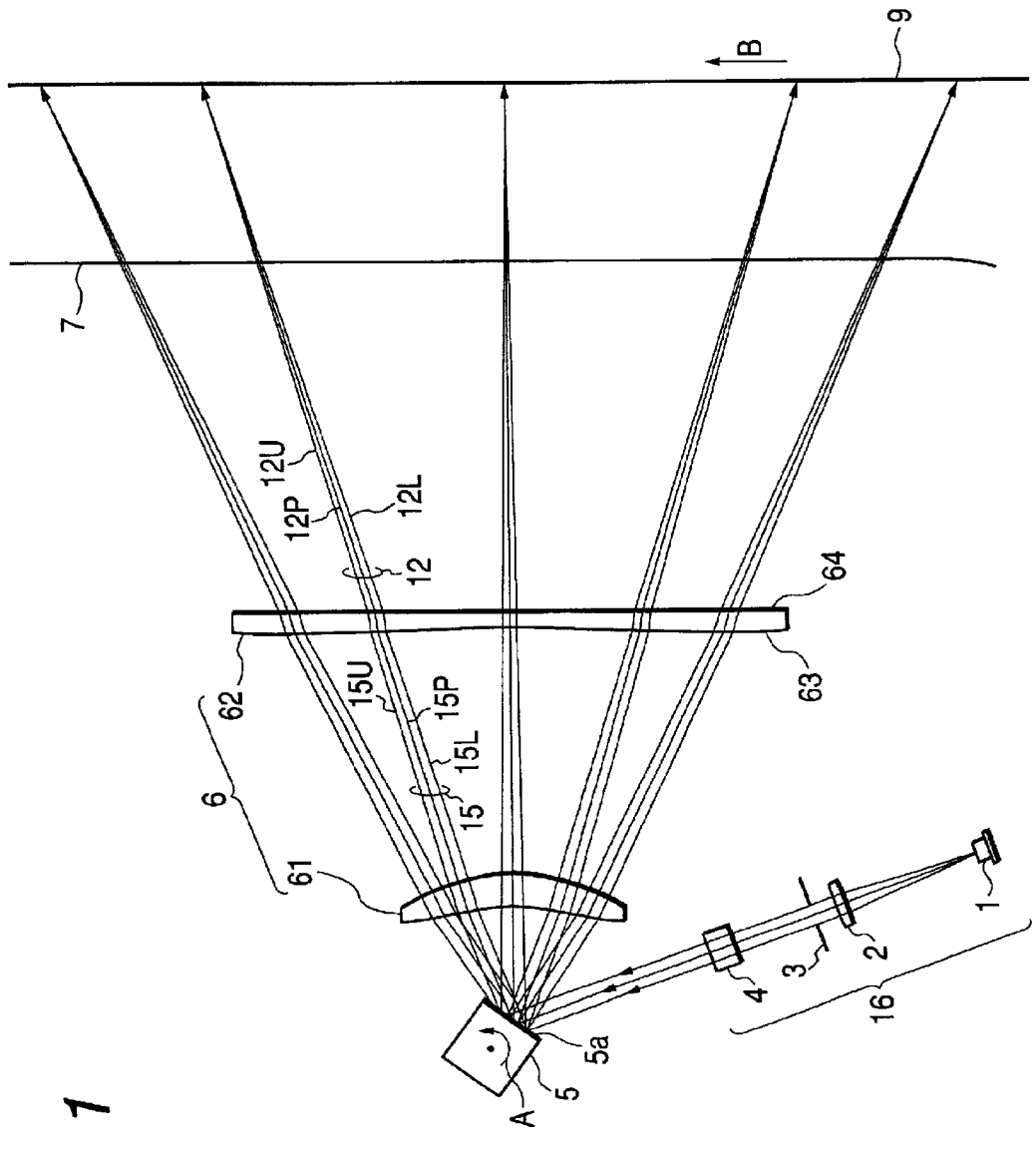
FIG. 1 is a cross-sectional view of the essential portions of Embodiment 1 of the present invention in the main scanning direction.
Figure 2:
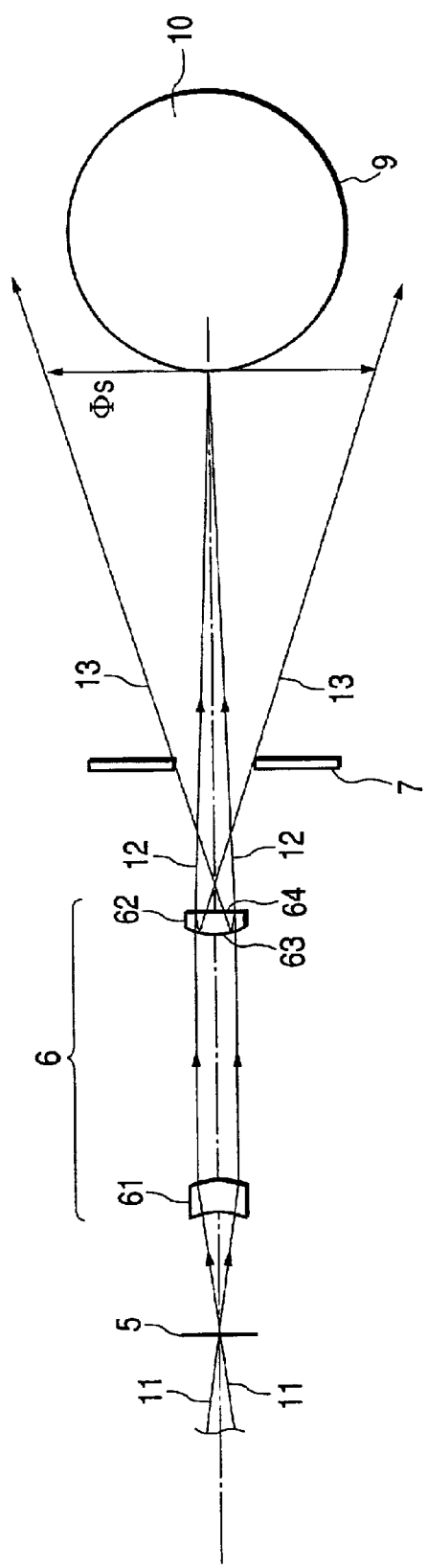
FIG. 2 is a cross-sectional view of the essential portions of Embodiment 1 of the present invention in the sub-scanning direction.
Figure 3:
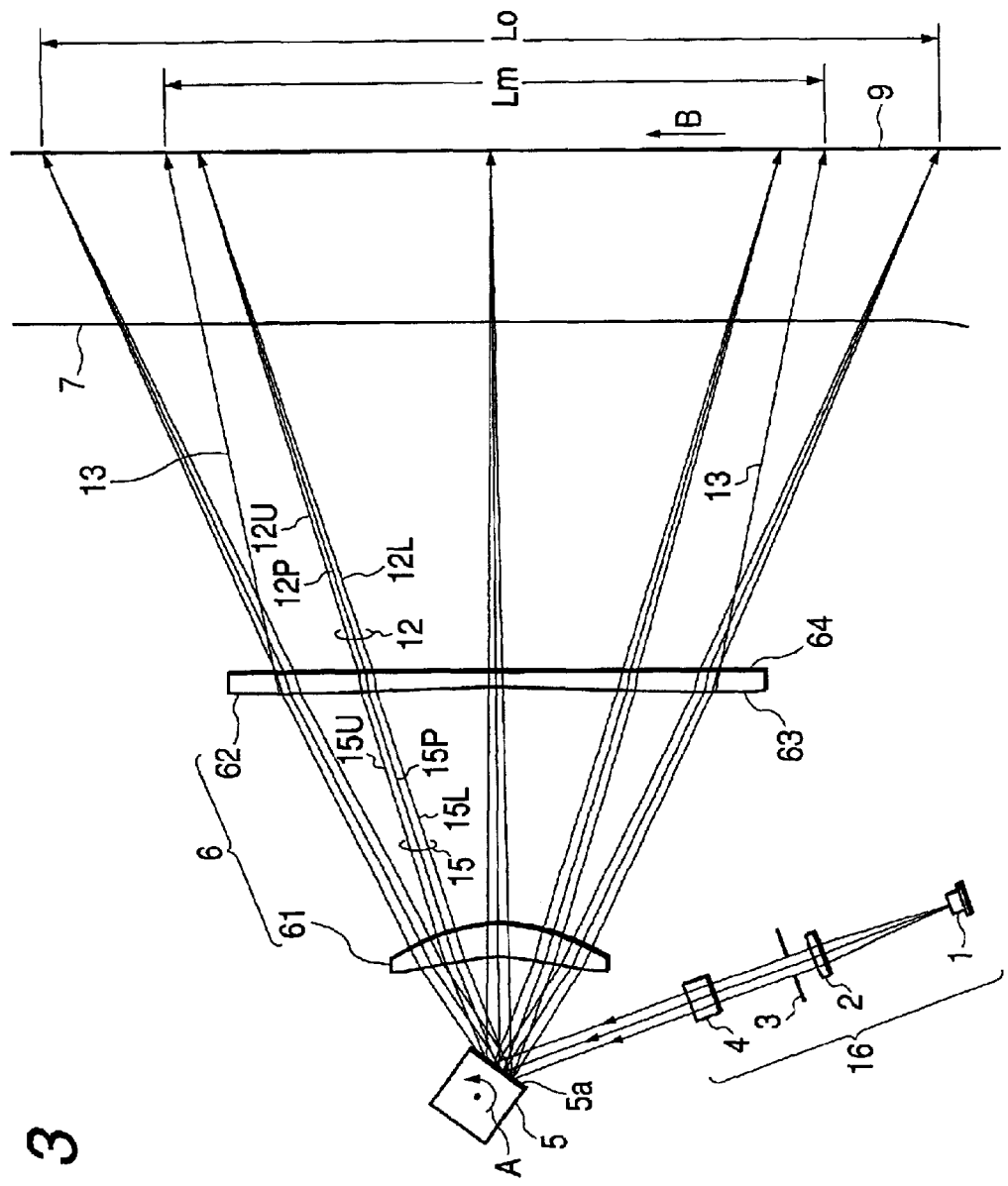
FIG. 3 is a cross-sectional view of the essential portions of Embodiment 1 of the present invention in the main scanning direction.
Figure 4:
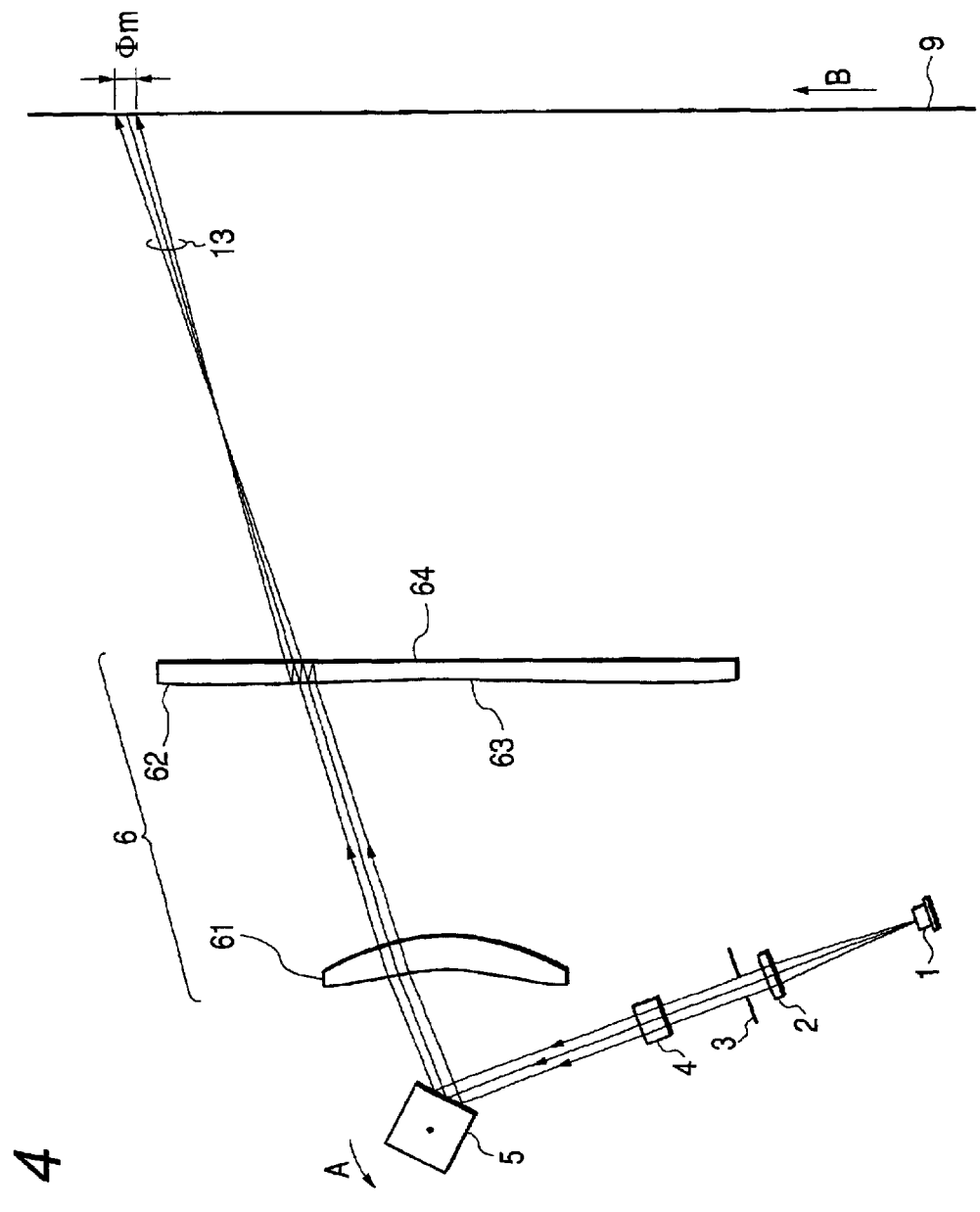
FIG. 4 is a cross-sectional view of the essential portions of Embodiment 1 of the present invention in the main scanning direction.

FIG. 1 is a cross-sectional view of the essential portions of Embodiment 1 of the scanning optical apparatus of the present invention in the main scanning direction (a main scanning cross-sectional view), and FIG. 2 is a cross-sectional view of the essential portions of FIG. 1 in the sub-scanning direction (a sub-scanning cross-sectional view). FIG. 3 is a main scanning cross-sectional view showing the relation between the scanning width Lm and effective scanning width Lo of the stray light 13 of unnecessary diffracted light, and FIG. 4 is a main scanning cross-sectional view showing the manner in which unnecessary diffracted light created by the diffracting surface of a diffracting optical element is surface-reflected by a refracting surface and is incident on a surface to be scanned as the stray light 13 of the unnecessary diffracted light.

Herein, the direction in which a beam is reflected and deflected (deflected and scanned) by a light deflector is defined as the main scanning direction, and a direction orthogonal to the optical axis of imaging means and the main scanning direction is defined as the sub-scanning direction.

In these figures, reference numeral 1 designates light source means comprising a semiconductor laser having a single light emitting point. Reference numeral 2 denotes a collimator lens which converts a divergent beam emitted from the light source means 1 into a substantially parallel beam. Reference numeral 3 designates an aperture stop which limits the passing beam (the quantity of light). Reference numeral 4 denotes a cylindrical lens which has predetermined refractive power only in the sub-scanning direction and causes the beam passed through the aperture stop 3 to be imaged as a substantially linear image on the deflecting surface of a light deflector 5 which will be described later in the sub-scanning cross section.

Each of the elements such as the semiconductor laser 1, the collimator lens 2, the aperture stop 3 and the cylindrical lens 4 constitutes an element of incidence optical means.

Reference numeral 5 designates a light deflector comprising, for example, a polygon mirror (rotary polygon mirror) as deflecting means, and rotated at a constant speed in the direction of arrow A by driving means (not shown) such as a motor.

Reference numeral 6 denotes imaging means (an fθ lens system) having an fθ characteristic, and having, in succession from the light deflector 5 side, a toric lens 61 made of plastic, and a long diffracting optical element 62 made of plastic manufactured by injection molding, and having, in the entire system, different predetermined refractive powers in the main scanning direction and the sub-scanning direction, and this imaging means 6 causes a beam based on image information reflected and it deflected (deflected and scanned) by the light deflector 5 to be imaged on a surface 9 to be scanned, and corrects the surface inclination of the deflecting surface 5a of the light deflector 5. The long diffracting optical element 62 has its incidence surface 63 comprised of a refracting surface and its exit surface 64 comprised of a diffracting surface (diffraction grating surface). The base surface of the diffracting surface in the present embodiment is of a flat shape, as seen in broad perspective.

In the present embodiment, most of a beam 15 (15P, 15U, 15L) reflected and deflected by the light deflector 5 is diffracted as diffracted light (diffracted light used) 12 (12P, 12U, 12L) of an order (usually the+first order) used on the diffracting surface 64 and is imaged on the surface 9 to be scanned, and forms a beam spot.

Here, the diffracted light used refers to diffracted light used to form a spot on the surface 9 to be scanned, of the diffracted lights diffracted by the diffracting surface 64. Also, in contrast with the diffracted light of the order used, diffracted lights of the other orders are referred to as the unnecessary diffracted lights. The diffracted light used in the present embodiment is a transmitted diffracted light of the first order, and main one of the unnecessary diffracted lights is a reflected diffracted light of the sixth order (reflected sixth-order diffracted light).

Reference numeral 7 designates a slit member of an elongate shape disposed in the optical path between the diffracting surface 64 and the surface 9 to be scanned and disposed substantially in parallel along the main scanning direction.

Reference numeral 9 denotes a photosensitive drum surface as the surface to be scanned, and reference numeral 10 designates a photosensitive member (image bearing member).

In the present embodiment, a divergent beam emitted from the light source means 1 is made into a substantially parallel beam by the collimator lens 2, and this beam is limited by the aperture stop 3 and enters the cylindrical lens 4 having predetermined refractive power only in the sub-scanning direction. In the main scanning cross section, the substantially parallel beam having entered the cylindrical lens 4 emerges therefrom in its intact state. Also in the sub-scanning cross section, it converges and is imaged as a substantially linear image on the deflecting surface (reflecting surface) 5a of the light deflector 5 comprising a polygon mirror.

The beam reflected and deflected by the deflecting surface 5a of the light deflector 5 is directed onto the photosensitive drum surface 9 as the surface to be scanned through the imaging means 6 having the fθ characteristic, and the light deflector 5 is rotated in the direction of arrow A, whereby the photosensitive drum surface 9 is optically scanned in the direction of arrow B (the main scanning direction) to thereby effect the recording of image information.

The behavior of the diffracted light 12 and unnecessary diffracted lights caused by the beam 15 reflected and deflected by the light deflector 5 being diffracted by the diffracting surface 64 will now be described with reference to FIGS. 2 and 4.

In these figures, reference numeral 13 denotes the stray light of one of the unnecessary diffracted lights (reflected sixth-order diffracted lights) reflected by the diffracting surface 64, which is surface-reflected by the refracting surface 63 and further travels toward the surface 9 to be scanned as the diffracted light used (usually+first-order diffracted light) by the refracting surface 64.

In the present embodiment, as shown in FIG. 2, the stray light 13 of the unnecessary diffracted light is once condensed between the diffracting surface 64 and the surface 9 to be scanned in the sub-scanning cross section, whereafter it is incident, without being condensed, on the photosensitive drum surface 9 which is the surface to be scanned in its fuzzy state while spreading to a width of Φs in the sub-scanning direction. Also, as shown in FIG. 4, the stray light 13 of the unnecessary diffracted light is once condensed between the diffracting surface 64 and the surface 9 to be scanned in the main scanning cross section, whereafter it is incident, without being condensed, on the photosensitive drum surface 9 which is the surface to be scanned in its fuzzy state while spreading to a width of Φm in the main scanning direction.

How the stray light of the reflected sixth-order diffracted light scans on the surface to be scanned is as already described with reference to FIG. 9. That is, in FIG. 9, the axis of abscissas represents the image height at which the original beam spot arrives at the surface 9 to be scanned, and the axis of ordinates represents the position in which the stray light of the then reflected sixth-order diffracted light arrives at the surface 9 to be scanned. As will be seen from FIG. 9, as the original beam spot scans on the surface 9 to be scanned, the stray light of the reflected sixth-order diffracted light also scans on the surface 9 to be scanned in conformity therewith, and the scanning range thereof is of the order of ±80 mm (scanning width Lm=160) which is about 73% of an effective scanning range ±110 mm (effective scanning width Lo=220).

The fact that the scanning range of the stray light of the unnecessary diffracted light becomes narrow means that the scanning speed becomes low, in other words, the energy density of the stray light increases.

So, in the present embodiment, the radii of curvature or the like of the refracting surface 63 of the diffracting optical element 62 in the main scanning direction and the sub-scanning direction are appropriately set, whereby the expanse (size) of the stray light of the unnecessary diffracted light when it is incident on the surface 9 to be scanned is set so as to be wider in the sub-scanning direction than in the main scanning direction. That is, in the present embodiment, the power arrangement of the imaging means 6 in the sub-scanning direction is set for optimization at any time so as to satisfy the following conditional expression (1):

$$\Phi s/\Phi m > Lo/Lm, \tag{1}$$

(where

Φs: the expanse of the stray light of the unnecessary diffracted light on the surface to be scanned in the sub-scanning direction;

Φm: the expanse of the stray light of the unnecessary diffracted light on the surface to be scanned in the main scanning direction;

Lm: the scanning width of the stray light of the unnecessary diffracted light;

Lo: the effective scanning width.)

Thereby, in the present embodiment, the beam is widened in the sub-scanning direction on the surface to be scanned (photosensitive drum surface) 9, that is, the imaged state of the stray light 13 of the unnecessary diffracted light is made into a fuzzy state on the surface 9 to be scanned, whereby the energy density of the stray light is reduced to thereby obtain a clear and sharp-cut image.

To increase the expanse of the stray light of the unnecessary diffracted light in the sub-scanning direction, it is preferable that the power of the refracting surface 63 of the diffracting optical element 62 in the sub-scanning direction be positive. This is because if the power of the refracting surface 63 in the sub-scanning direction is positive, the position at which the stray light of the unnecessary diffracted light is condensed is pulled toward the light deflector 5 side in the direction of the optical axis and the expanse Φs of the stray light of the unnecessary diffracted light in the sub-scanning direction is increased on the surface 9 to be scanned.

Figure 9:
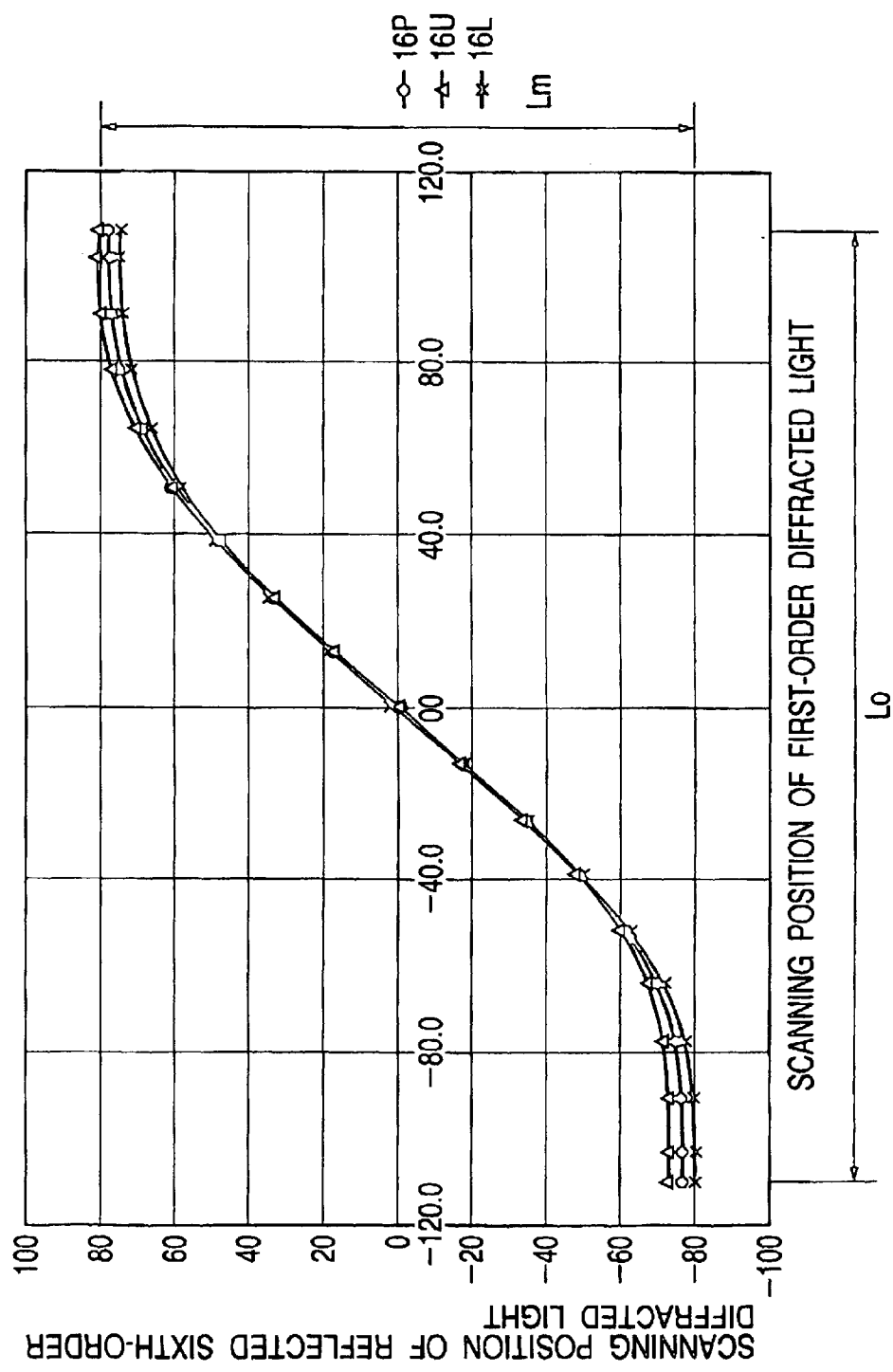
FIG. 9 shows how the stray light of reflected sixth-order diffracted light scans on a surface to be scanned.

Specifically, as will be seen from FIG. 9, the expanse Φm of the stray light of the unnecessary diffracted light in the main scanning direction is of the order of 8 mm at most and therefore, if the expanse Φs of the stray light of the unnecessary diffracted light in the sub-scanning direction is optimized so that Φs>11 (mm), the above-mentioned relational expression (1) can be satisfied because Lo/Lm=1.37.

Description will now be made of the reason why in the present embodiment, attention is particularly paid to the reflected diffracted light of the sixth order as the unnecessary diffracted light. When like the diffracting surface 64, a diffraction grating is formed on the exit surface of an optical element, if the order of the transmitted diffracted light used is n, the grating height h of the diffracting surface 64 is usually set so that the diffraction efficiency of the transmitted diffracted light used may become greatest. Specifically, the grating height h can be set so that there may be provided a phase difference integer times as great as the wavelength λ used of the light source, and becomes the following expression:

$$h=n\lambda/(N-1), \tag{2}$$

(where

N: the refractive index of the member constituting the diffraction grating at the wavelength λ used.

n: the order of the diffracted light used)

At this time, again in reflected diffracted lights created by the diffracting surface 64, the reflected diffracted light of an order in which a phase difference integer times as great as the wavelength λ used is provided becomes greatest. Specifically, if the order of such reflected diffracted light is m, what satisfies the expression that $$h=m\lambda/(2N) \tag{3}$$

becomes greatest.

From the above-mentioned relational expressions (2) and (3), the relation between the orders m and n is $$m/n=2N/(N-1). \tag{4}$$

The right side of this relational expression (4) is determined by the refractive index of the member constituting the diffraction grating at the wavelength λ used, and the refractive index of a material such as ordinary glass or plastic is within a range of about 1.4–2.0 and therefore, from relational expression (4), $$4 \leq m/n \leq 7 \tag{5}$$

is derived.

The order of the diffracted light used is usually n=1, and when the diffracting optical element 62 is formed of plastic from the viewpoints of the ease and cost of manufacture, the refractive index of the material is N≈1.5 and therefore, from relational expression (4), it follows that reflected diffracted light of the sixth order occurs strongly.

As described above, in the present embodiment, the expanse of the stray light 13 of the unnecessary diffracted light when it is incident on the surface 9 to be scanned is set so as to become wider in the sub-scanning direction than in the main scanning direction, whereby an image (beam spot) on the surface 9 to be scanned can be made sharp-cut, whereby in a laser beam printer, the problem that print becomes blurry can be solved.

Again in the present embodiment, as in the aforedescribed example of the prior art, design is made such that any magnification change and focus change in the main scanning direction resulting from the fluctuation of the temperature of the scanning optical apparatus are corrected by a change in the power of the refracting portion and diffracting portion of the imaging means and a fluctuation in the wavelength of the semiconductor laser which is the light source means.

<Embodiment 2>

Figure 5:
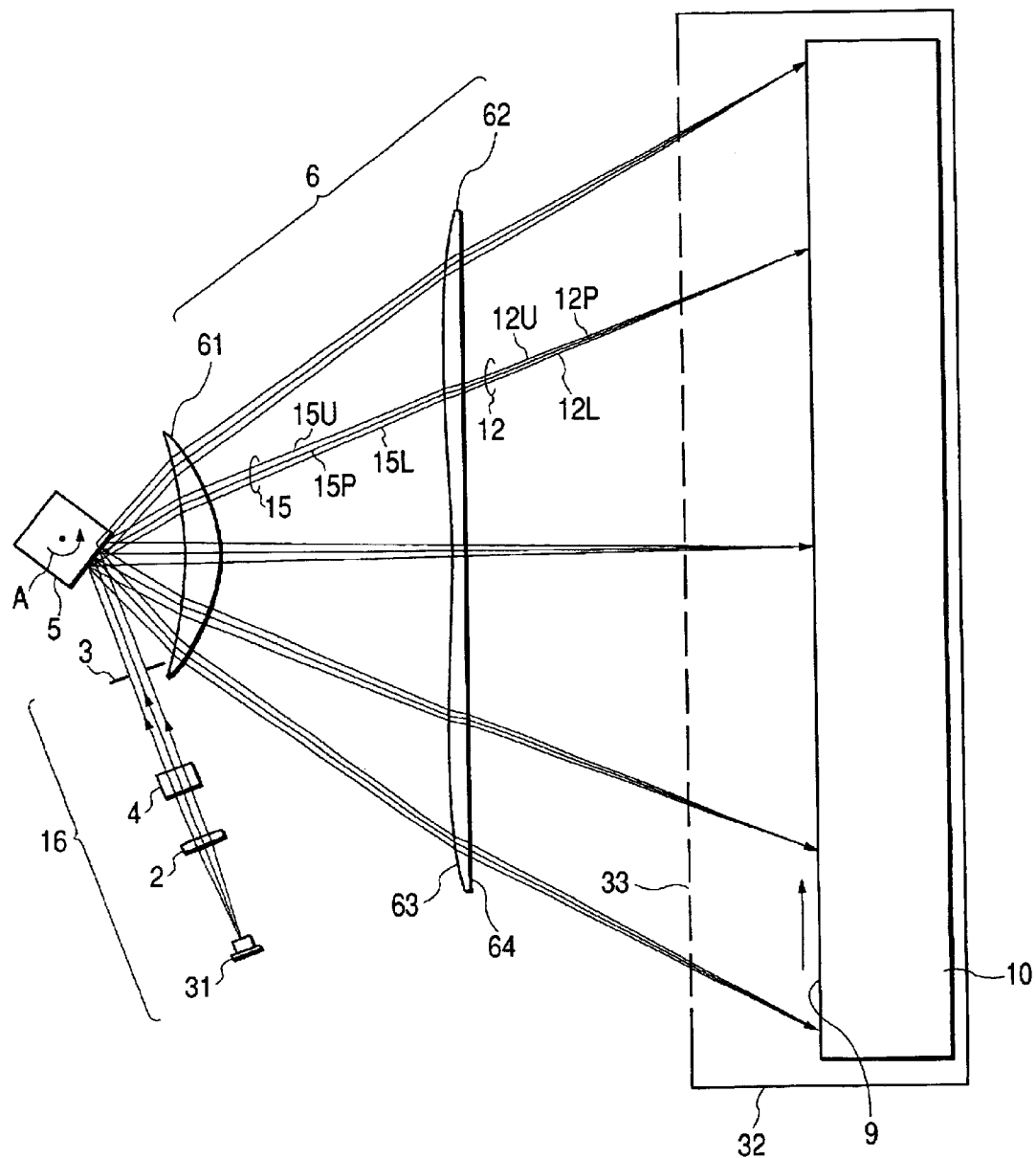
FIG. 5 is a cross-sectional view of the essential portions of Embodiment 2 of the present invention in the main scanning direction.
Figure 6:
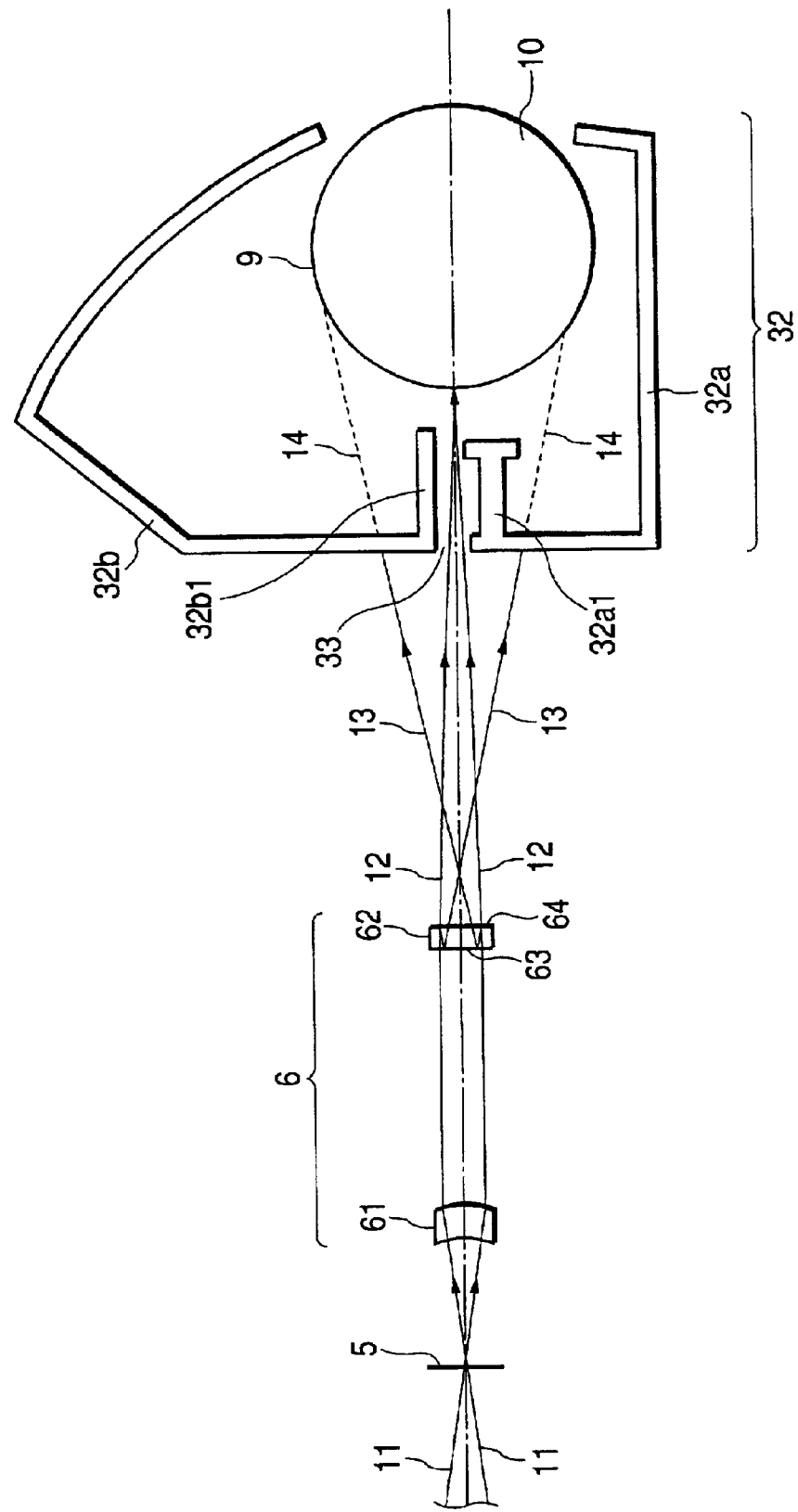
FIG. 6 is a cross-sectional view of the essential portions of Embodiment 2 of the present invention in the sub-scanning direction.

FIG. 5 is a cross-sectional view of the essential portions of Embodiment 2 of the scanning optical apparatus of the present invention in the main scanning direction (a main scanning cross-sectional view), and FIG. 6 is a cross-sectional view of the essential portions of FIG. 5 in the sub-scanning direction (a sub-scanning cross-sectional view). In FIGS. 5 and 6, the same elements as the elements shown in FIGS. 1 and 2 are given the same reference characters.

The differences of the present embodiment from the aforedescribed Embodiment 1 are that the light source means is comprised, for example, of a multi-semiconductor laser 31 having a plurality of light emitting points, and that most of the stray light 13 of the unnecessary diffracted light is limited by a limiting member 32, and in the other points, the construction and optical action of the present embodiment are substantially similar to those of Embodiment 1, whereby a similar effect is obtained.

In FIGS. 5 and 6, reference numeral 31 designates light source means comprising, for example, a multi-semiconductor laser 31 having a plurality of light emitting points. Reference numeral 32 denotes a casing formed of opaque resin holding a photosensitive member 10 as a limiting member, and having an incidence window 33 disposed in the optical path between the diffracting surface 64 and the surface 9 to be scanned along the direction of deflection of a beam. The incidence window 33 allows to pass through the diffracted light used (usually+first-order diffracted light) of diffracted lights diffracted by the diffracting surface 64, and intercept most of the stray light of unnecessary diffracted lights of the other orders.

The behavior of the diffracted light of the beam 15 reflected and deflected by the light deflector 5 which has been diffracted by the diffracting surface 64 will now be described with reference to FIG. 6.

In FIG. 6, the casing 32 is comprised of first and second casing members 32a and 32b covering the photosensitive member 10 and a process part (not shown) for realizing the known electrophotographic process integrally made into a unit.

In FIG. 6, reference numeral 13 designates the stray light of one of unnecessary diffracted lights (reflected sixth-order diffracted lights) reflected by the diffracting surface 64, which is surface-reflected by the refracting surface 63 and further travels toward the surface 9 to be scanned as diffracted light used (usually+first-order diffracted light) by the diffracting surface 64.

This stray light 13 of the unnecessary diffracted light is once condensed between the diffracting surface 64 and the surface 9 to be scanned in the sub-scanning cross section, whereafter most of it is limited by the incidence window 33, and part of it is incident, without being condensed, on the photosensitive drum surface 9 which is the surface to be scanned in a fuzzy state while spreading in the sub-scanning direction.

The incidence window 33 is formed by the end portions (edge portions) 32a1 and 32b1 of the first and second casing members 32a and 32b which are substantially parallel to the main scanning direction, and intactly passes therethrough a beam 12 forming an original beam spot, and intercepts most of the stray light 13 of the unnecessary diffracted light. That is, the stray light of the reflected sixth-order diffracted light is limited by the incidence window 33. Thereby, the stray light 14 of the unnecessary diffracted light which has arrived at the photosensitive member 10 when the incidence window 33 is absent can be greatly reduced.

In the present embodiment, as described above, of the diffracted lights diffracted by the diffracting surface 64, the stray light 13 of the unnecessary diffracted lights of the other orders than the diffracted light of the order used (diffracted light used) is limited by the incidence window 33 provided in the casing 32, and as in the aforedescribed Embodiment 1, the radii of curvature or the like of the refracting surface 63 of the diffracting optical element 62 in the main scanning direction and the sub-scanning direction are appropriately set and the expanse of the stray light 13 of the unnecessary diffracted light when it is incident on the surface 9 to be scanned is set so as to be wider in the sub-scanning direction than in the main scanning direction, whereby the image (beam spot) on the surface 9 to be scanned can be made sharp-cut, whereby for example, in a laser beam printer, the problem that print becomes unclear can be solved.

While in the present embodiment, the limiting member (incidence window) for limiting the stray light of the unnecessary diffracted light is formed by the end portions (edge portions) 32a1 and 32b1 of the first and second casing members 32a and 32b constituting the casing 32, this is not always restrictive. Also, as the limiting member disposed between the diffracting surface 64 and the surface 9 to be scanned along the main scanning direction, use may be made of a part or a device disposed near the photosensitive member 10 for realizing the known electrophotographic process, for example, a charging device or a developing device with its shape optimized. Further, use may be made of a structure such as a frame or a side wall present between the diffracting surface 64 and the surface 9 to be scanned.

Besides, as the limiting member, the slit member 7 shown in the aforedescribed Embodiment 1 may be utilized and the opening portion of the slit member 7 may be appropriately set to thereby limit the stray light 13 of the unnecessary diffracted light.

While in each of the above-described embodiments, the imaging means (scanning lens system) is comprised of two lenses, this is not restrictive, but the number of lenses may be, for example, one or three or more. Also, the lens type of the imaging means is not restricted to the type shown in each embodiment, but can be applied to all of imaging means using a diffracting optical element. Further, the diffracting surface is not restricted to a single surface, but diffraction gratings may be formed on a plurality of surfaces.

Furthermore, the light source means is not restricted to a semiconductor laser. Also, while in each embodiment, use is made of a laser having a single light emitting point or a laser having a plurality of light emitting points, this is not restrictive. Further, as a light source emitting a plurality of beams, use may be made of a light source emitting a plurality of known beams such as a monolithic multibeam or a multibeam comprising a plurality of single beams compounded together.

Also, while in each embodiment, description has been made with attention paid only to the reflected deflected lights of the sixth order, this is not restrictive. Also, as previously described, the orders of diffracted lights of high orders created differ depending on the refractive index of the diffracting optical element and the design order used and therefore the apparatus can be adapted thereto at any time. Also, in the actual manufacture, an error occurs to the height of the diffraction grating and therefore an error also occurs to the orders of high-order diffracted lights created and thus, the apparatus can be adapted thereto at any time.

In each of the above-described embodiment, design may be made such that part of the other unnecessary diffracted lights than the diffracted light used created from the diffracting surface 64 is intercepted by the slit member 7.

Also, while in each embodiment, use is made of a long diffracting optical element made of plastic manufacture by injection molding, use may also be made of a diffracting optical element manufactured by a replica method of making a diffraction grating on a base substrate. Also, the base surface of the diffracting surface of the diffracting optical element is not limited to a flat shape, but may be, for example, of a curved surface shape.

<Image Forming Apparatus>

Figure 7:
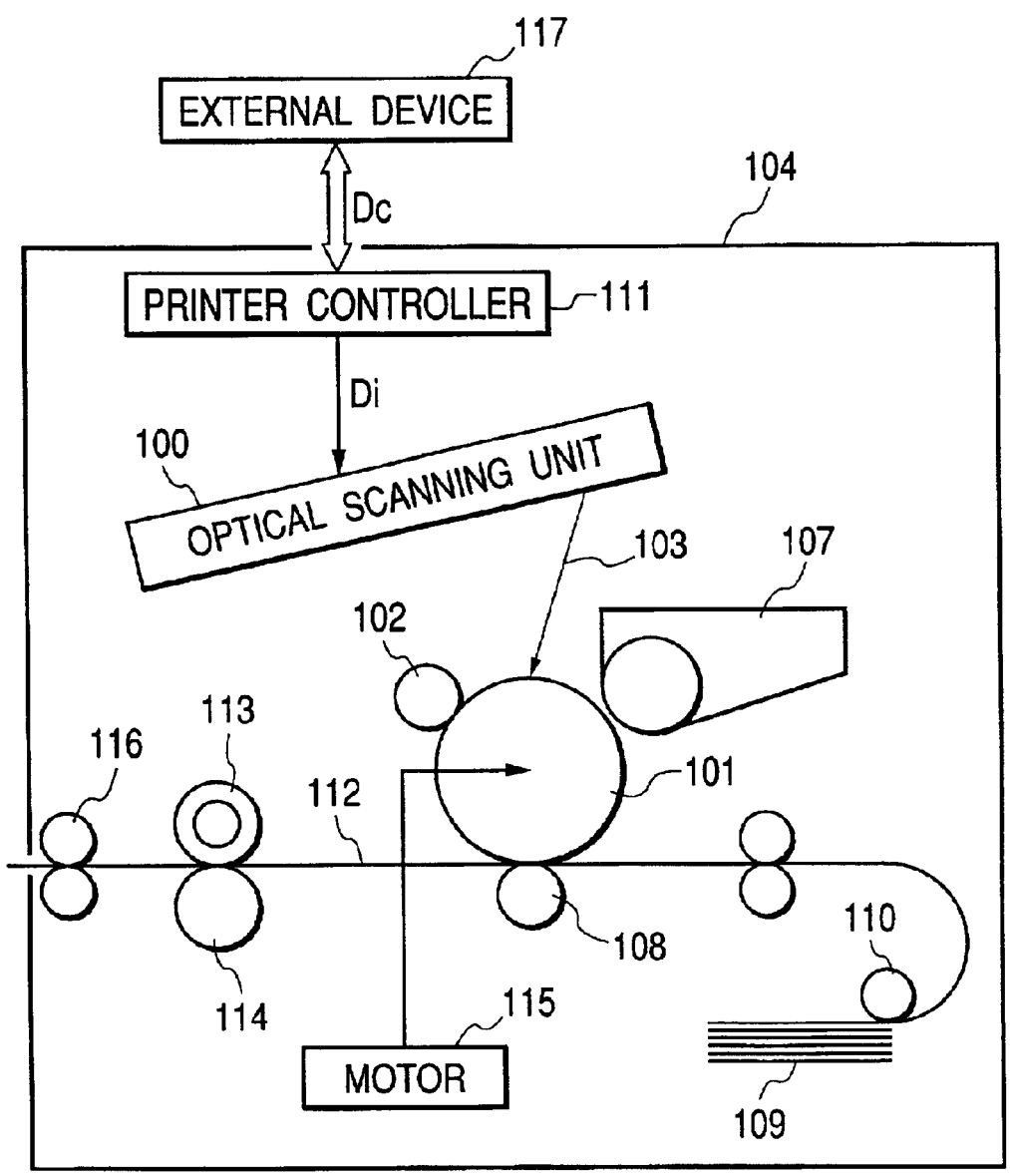
FIG. 7 is a cross-sectional view of essential portions in the sub-scanning direction showing an example of the construction of an image forming apparatus (electrophotographic printer) using the scanning optical apparatus of the present invention.
Figure 8:
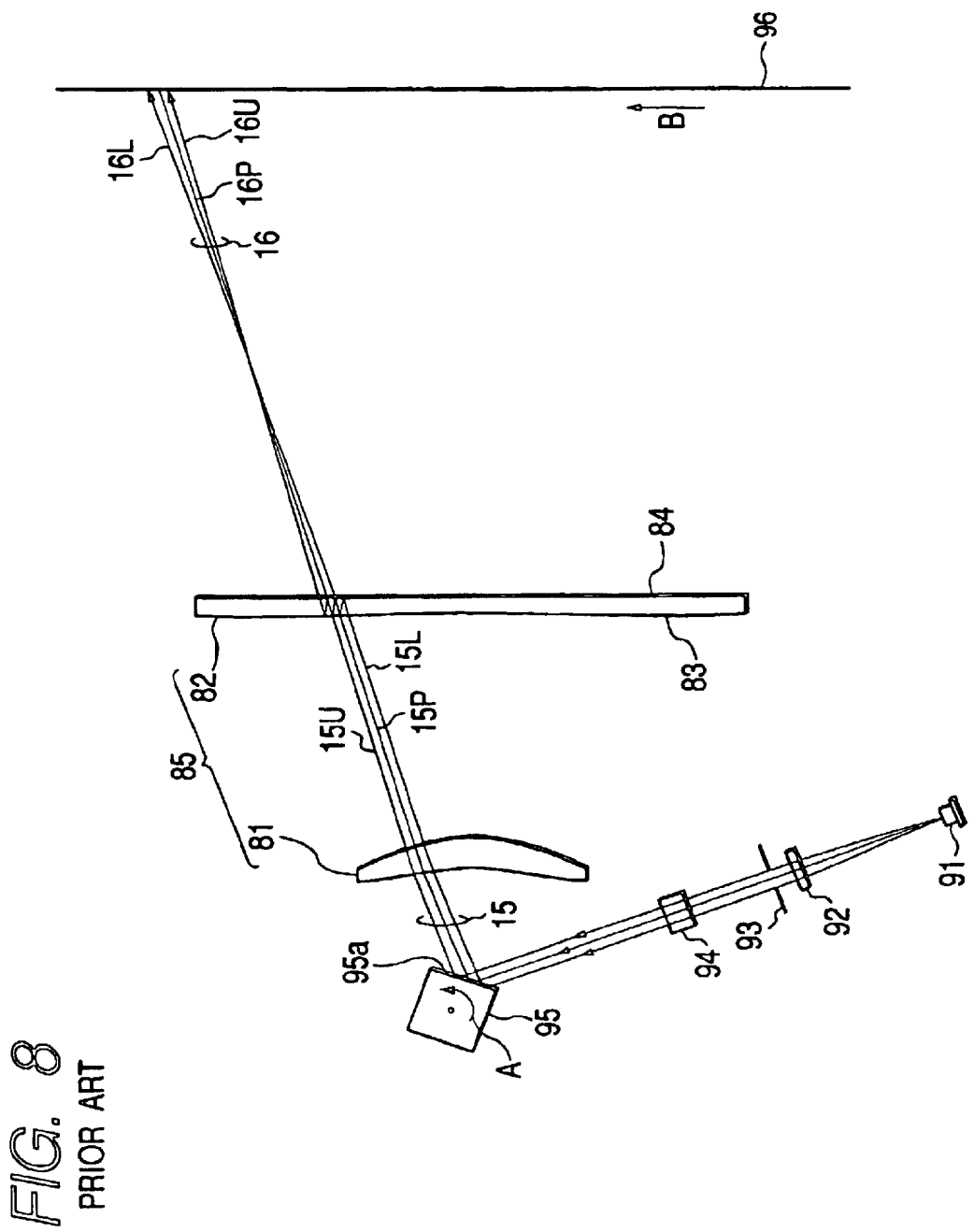
FIG. 8 is a schematic view of the essential portions of a conventional scanning optical apparatus.

FIG. 7 is a cross-sectional view of the essential portions of an embodiment of an image forming apparatus (electrophotographic printer) using the scanning optical apparatus of the aforedescribed Embodiment 1 or 2 in the sub-scanning direction. In FIG. 7, reference numeral 104 designates the image forming apparatus. Code data Dc is inputted from an external device 117 such as a personal computer to this image forming apparatus 104. This code data Dc is converted into image data (dot data) Di by a printer controller 111 in the apparatus. This image data Di is inputted to an optical scanning unit 100 having the construction shown in Embodiment 1 or 2. A light beam 103 modulated in conformity with the image data Di is emitted from the optical scanning unit (scanning optical apparatus) 100, and the photosensitive surface of a photosensitive drum 101 is scanned in the main scanning direction by the light beam 103.

The photosensitive drum 101 which is an electrostatic latent image bearing member (photosensitive member) is clockwisely rotated by a motor 115. With this rotation, the photosensitive surface of the photosensitive drum 101 moves relative to the light beam 103 in the sub-scanning direction orthogonal to the main scanning direction. Above the photosensitive drum 101, a charging roller 102 for uniformly charging the surface of the photosensitive drum 101 so as to contact with the surface of the latter. The light beam 103 scanned by the optical scanning unit 100 is applied to the surface of the photosensitive drum 101 charged by the charging roller 102.

As previously described, the light beam 103 is modulated on the basis of the image data Di, and by applying this light beam to the surface of the photosensitive drum 101, an electrostatic latent image is formed on the surface of the photosensitive drum 101. This electrostatic latent image is developed as a toner image by a developing device 107 disposed so as to abut against the photosensitive drum 101 downstream of the applied position of the light beam 103 with respect to the direction of rotation of the photosensitive drum 101.

The toner image developed by the developing device 107 is transferred onto a sheet 112 which is a transfer material by a transferring roller (transferring device) 108 disposed below the photosensitive drum 101 so as to be opposed to the photosensitive drum 101. While the sheet 112 is contained in a sheet cassette 109 disposed forwardly (rightwardly as viewed in FIG. 7) of the photosensitive drum 101, it can also be manually fed. A feed roller 110 is disposed on an end portion of the sheet cassette 109, and feeds the sheets 112 in the sheet cassette 109 one by one into a conveying path.

The sheet 112 to which the unfixed toner image has been transferred in the manner described above is further conveyed to a fixing device disposed rearwardly (leftwardly as viewed in FIG. 7) of the photosensitive drum 101. The fixing device is comprised of a fixing roller 113 having a fixing heater (not shown) therein and a pressure roller 114 disposed so as to be in pressure contact with the fixing roller 113, and pressurizes and heats the sheet 112 conveyed thereto from the transferring portion by the portion of pressure contact between the fixing roller 113 and the pressure roller 114 to thereby fix the unfixed toner image on the sheet 112. A delivery roller 116 is disposed rearwardly of the fixing roller 113 and delivers the sheet 112 now with the toner image thereon fixed out of the image forming apparatus.

Although not shown in FIG. 7, the printer controller 111 effects not only the conversion of the aforedescribed data, but also the control of various portions in the image forming apparatus including the motor 115 and a polygon motor or the like in the optical scanning unit 100.

According to the present invention, as previously described, there can be achieved a scanning optical apparatus in which the expanse (size) of the stray light of unnecessary diffracted light when surface-reflected by the refracting surface of imaging means and being incident on a surface to be scanned is set so as to be wider in the sub-scanning direction than in the main scanning direction, whereby the stray light can be prevented from being condensed on the surface to be scanned to thereby prevent the flare of an image from being clearly imprinted, and reduce the influence of the stray light, whereby the deterioration of image heretofore caused by the stray light, and particularly the problem that the printing of images by an image forming apparatus using the scanning optical apparatus of the present invention becomes blurry can be prevented and clear and sharp-cut images can be obtained, and an image forming apparatus using the same.

What is claimed is:

1. A scanning optical apparatus in which at least one beam emitted from light source means is deflected by deflecting means, the beam deflected by said deflecting means is caused to be imaged on a surface to be scanned by imaging means having a diffracting surface on at least one surface thereof to be scanned on said surface to be scanned, wherein of diffracted lights diffracted by said diffracting surface, relative to the diffracted light of an order used to form a spot on said surface to be scanned, the width of the expanse of one of unnecessary diffracted lights of the other orders undergoing surface-reflection by a refracting surface of said imaging means upon incidence on said surface to be scanned is designed to be wider in the sub-scanning direction than in the main scanning direction.

2. A scanning optical apparatus according to claim 1, wherein said unnecessary diffracted light is once condensed between said diffracting surface and said surface to be scanned in the sub-scanning cross section.

3. A scanning optical apparatus according to claim 2, wherein said imaging means is provided with a diffracting optical element having the refracting surface on the incidence surface thereof and having the diffracting surface on the exit surface thereof, and the power of said refracting surface in the sub-scanning direction is positive.

4. A scanning optical apparatus according to claim 1, wherein said unnecessary diffracted light is limited by a member disposed in the optical path between said diffracting surface and said surface to be scanned.

5. A scanning optical apparatus according to claim 1, wherein the width of the expanse of said unnecessary diffracted light satisfies the condition that $$\Phi s/\Phi m > Lo/Lm,$$

(where $\Phi s$: the width of the expanse of the unnecessary diffracted light on the surface to be scanned in the sub-scanning direction;

$\Phi m$: the width of the expanse of the unnecessary diffracted light on the surface to be scanned in the main scanning direction;

Lm: the scanning width of the unnecessary diffracted light;

Lo: the effecting scanning width.)

6. A scanning optical apparatus according to claim 1, wherein when said order used is defined as n and said other orders are defined as m, the condition that $$4 \leq m/n \leq 7$$

is satisfied.

7. A scanning optical apparatus according to claim 1, wherein the diffracted light of said order used is a transmitted diffracted light of the first order, and said unnecessary diffracted light is a reflected diffracted light of the sixth order.

8. A scanning optical apparatus including incidence optical means for causing at least one beam emitted from light source means to be made incident on deflecting means; and imaging means for imaging light beams reflected and deflected by the deflecting means on a surface to be scanned, the imaging means including a diffracting optical element having a diffracting surface on light exit surface thereof, in which first order diffracted light generated during passing through the diffracting surface disposed on the diffracting optical element is imaged on the surface to be scanned by the imaging means, wherein the following conditional expressions are satisfied, $$\Phi s/\Phi m > Lo/Lm,$$

$$\Phi s > \Phi m,$$

(where

Φs: the width of the expanse in the sub-scanning direction of sixth-order unnecessary diffracted light, which is generated on the diffracting surface and reflected on incident surface of the diffracting optical element and with which the surface to be scanned in scanned in the main scanning direction;

Φm: the width of the expanse of the sixth-order unnecessary diffracted light on the surface to be scanned in the main scanning direction;

Lm: the scanning width of the unnecessary diffracted light on the surface to be scanned;

Lo: the effective scanning width of the first order diffracted light on the surface to be scanned.)

9. A scanning optical apparatus according to claim 8, wherein the diffracting optical element is made of plastic material.

10. A scanning optical apparatus including incidence optical means for causing at least one beam emitted from light source means to be made incident on deflecting means; and imaging means for imaging light beams reflected and deflected by the deflecting means on a surface to be scanned, the imaging means including a diffracting optical element having a diffracting surface on light exit surface thereof, in which first order diffracted light generated during passing through the diffracting surface disposed on the diffracting optical element is imaged on the surface to be scanned by the imaging means, wherein an optical power of an incidence surface of the diffracting optical element in the sub-scanning direction is positive; and wherein the following conditional expressions are satisfied, $$\Phi s/\Phi m > Lo/Lm,$$

$$\Phi s > \Phi m,$$

(where

Φs: the width of the expanse in the sub-scanning direction of the sixth-order unnecessary diffracted light, which is generated on the diffracting surface and reflected on incident surface of the diffracting optical element and with which the surface to be scanned in scanned in the main scanning direction;

Φm: the width of the expanse of the sixth-order unnecessary diffracted light on the surface to be scanned in the main scanning direction;

Lm: the scanning width of the unnecessary diffracted light on the surface to be scanned;

Lo: the effective scanning width of the first order diffracted light on the surface to be scanned.)

11. A scanning optical apparatus according to claim 10, wherein the diffracting optical element is made of plastic material.

12. An image forming apparatus comprising:

a scanning optical apparatus according to any one of claims 1 to 7 or 8 to 11;

a photosensitive member disposed on said surface to be scanned;

a developing device for developing an electrostatic latent image formed on said photosensitive member by a beam scanned by said scanning optical apparatus as a toner image;

a transferring device for transferring the developed toner image to a transferring material; and a fixing device for fixing the transferred toner image on the transferring material.

13. An image forming apparatus comprising:

a scanning optical apparatus according to any one of claims 1 to 7 or 8 to 11; and a printer controller for converting code data inputted thereto from an external device into an image signal and inputting it to said scanning optical apparatus.

* * * * *

UNITED STATES PATENT AND TRADEMARK OFFICE
CERTIFICATE OF CORRECTION

| | |
|---|---|
| PATENT NO. | : 7,039,257 B2 |
| APPLICATION NO. | : 10/073108 |
| DATED | : May 2, 2006 |
| INVENTOR(S) | : Kazumi Kimura |

Page 1 of 1

It is certified that error appears in the above-identified patent and that said Letters Patent is hereby corrected as shown below:

COLUMN 1
        Line 39, "resulting" should read --resulting in--;
        Line 55, "surfaces" should read --surfaces--.

COLUMN 10
        Line 66, "manufacture" should read --manufactured--.

COLUMN 11
        Line 26, "clockwisely" should read --clockwise--.

COLUMN 13
        Line 3, "effecting" should read --effective--;
        Line 21, "light" should read --a light--;
        Line 37, "incident" should read --an incident--;
        Line 38, "in scanned" should read --is scanned--.

COLUMN 14
        Line 1, "in scanned" should read --is scanned--;
        Line 2, "light" should read --a light--; and
        Line 20, "incident" should read --an incident--.

Signed and Sealed this

Twenty-first Day of August, 2007

JON W. DUDAS
*Director of the United States Patent and Trademark Office*